United States Patent
Gehin et al.

(10) Patent No.: US 9,394,737 B2
(45) Date of Patent: Jul. 19, 2016

(54) METHOD FOR OPENING A MOVABLE PANEL OF A MOTOR VEHICLE

(75) Inventors: Frédéric Gehin, Créteil (FR); Eric Menard, Créteil (FR)

(73) Assignee: U-SHIN FRANCE SAS, Creteil (FR)

(*) Notice: Subject to any disclaimer, the term of this patent is extended or adjusted under 35 U.S.C. 154(b) by 135 days.

(21) Appl. No.: 14/343,996

(22) PCT Filed: Sep. 12, 2012

(86) PCT No.: PCT/EP2012/067803
§ 371 (c)(1),
(2), (4) Date: Jul. 16, 2014

(87) PCT Pub. No.: WO2013/037806
PCT Pub. Date: Mar. 21, 2013

(65) Prior Publication Data
US 2014/0330486 A1 Nov. 6, 2014

(30) Foreign Application Priority Data
Sep. 12, 2011 (FR) .................................. 11 02740

(51) Int. Cl.
| | |
|---|---|
| *B60R 22/00* | (2006.01) |
| *E05F 15/00* | (2015.01) |
| *E05F 15/20* | (2006.01) |
| *B60R 25/20* | (2013.01) |
| *G07C 9/00* | (2006.01) |

(Continued)

(52) U.S. Cl.
CPC ............. *E05F 15/2023* (2013.01); *B60R 25/01* (2013.01); *B60R 25/2054* (2013.01);
(Continued)

(58) Field of Classification Search
CPC ....... E05F 15/73; E05F 15/2023; E05F 15/70; E05F 15/74; E05F 15/76; B60R 25/2054; G07C 9/00
USPC ........................................................ 701/49
See application file for complete search history.

(56) References Cited

U.S. PATENT DOCUMENTS

| 2,704,339 A | * | 3/1955 | Wescott, Jr. .............. | F16P 3/148 |
| | | | | 192/130 |
| 2,914,709 A | * | 11/1959 | Rabinow .................. | E05F 15/78 |
| | | | | 250/214 R |

(Continued)

FOREIGN PATENT DOCUMENTS

| DE | 10 2007 041288 A1 | 3/2009 |
| DE | 10 2010 018164 A1 | 8/2011 |

(Continued)

OTHER PUBLICATIONS

International Search Report issued in PCT/EP2012/067803 mailed on Nov. 22, 2012 (6 pages).

*Primary Examiner* — Behrang Badii
*Assistant Examiner* — Daniel L Greene
(74) *Attorney, Agent, or Firm* — Osha Liang LLP

(57) ABSTRACT

The invention relates to a method for opening a movable panel of a motor vehicle, including the following steps: Step A (1)—the presence of at least one body part of a person is detected by a capacitive or non-capacitive sensor; Step B (2)—the person is authenticated as being authorized to unlock the vehicle by an authentication means; Step C (5)—a virtual switch is produced by projecting a light pattern onto the ground on which the motor vehicle is standing; and Step D (6)—the person positions his/her foot so as to obscure the virtual switch in a predetermined manner; Step E (7)—if the foot is not positioned in the predetermined manner, a signal is sent to restart step D, or if the foot is positioned in the predetermined manner, a control means opens the movable panel.

10 Claims, 2 Drawing Sheets

(51) Int. Cl.
  *B60R 25/01*   (2013.01)
  *E05F 15/73*   (2015.01)
(52) U.S. Cl.
  CPC . *E05F15/73* (2015.01); *G07C 9/00* (2013.01); *G07C 9/00309* (2013.01); *E05F 2015/765* (2015.01); *E05Y 2400/82* (2013.01); *E05Y 2400/852* (2013.01); *E05Y 2400/858* (2013.01); *E05Y 2900/546* (2013.01); *G07C 2209/64* (2013.01)

(56) References Cited

U.S. PATENT DOCUMENTS

| | | | | |
|---|---|---|---|---|
| 2003/0095040 | A1* | 5/2003 | Shimomura | B60R 25/1004 340/426.13 |
| 2005/0063566 | A1* | 3/2005 | Beek | A61B 5/0059 382/115 |
| 2005/0171787 | A1* | 8/2005 | Zagami | G06Q 20/401 285/382 |
| 2007/0055888 | A1* | 3/2007 | Miller | G06F 21/32 713/186 |
| 2008/0170123 | A1* | 7/2008 | Albertson | A63B 24/0003 348/157 |
| 2008/0296926 | A1 | 12/2008 | Hanzel et al. | |

FOREIGN PATENT DOCUMENTS

| | | |
|---|---|---|
| EP | 0 770 749 A2 | 5/1997 |
| EP | 1 902 912 A1 | 3/2008 |
| EP | 2 098 671 A1 | 9/2009 |
| FR | 2 936 546 A1 | 4/2010 |
| WO | 2007/006514 A1 | 1/2007 |

* cited by examiner

METHOD FOR OPENING A MOVABLE PANEL OF A MOTOR VEHICLE

The present invention concerns a method for opening an opening panel of a motor vehicle.

Devices allowing an opening panel of a motor vehicle to be opened using the physical contact of the hand or of a finger of the user on a switch allowing said opening panel to be opened after the motor vehicle is unlocked are known. The opening panel is generally a trunk or a side door.

However, this type of opening of an opening panel requires the user to have a free hand. However, in the event of the user having both hands already occupied or being unable to use them, there is a need to allow an opening panel of a motor vehicle to be opened without using the hands of the user.

In order to meet this need, it is known practice to propose a device for opening an opening panel in which a sensor allows the control for opening an opening panel to be operated.

For example, the sensor is electro-optical using one or more cameras.

At the same time, it is necessary to detect the presence of the individual and to authenticate said individual so that the control is able to open the trunk for the duly authorized person. However, when the opening of an opening panel is authorized, it is necessary to ensure the reliability and effectiveness of the whole of the method for opening an opening panel in order to prevent any intrusion in the vehicle by an unauthorized person. This allows the security of the motor vehicle to be guaranteed.

By way of example, the applications WO2007/006514 and EP0770749 may be cited, which describe a method for opening a trunk in which the individual wishing to open the trunk is authenticated.

Now, detection, authentication and opening panel control devices from the prior art each require a sufficiently high power consumption for the battery of the motor vehicle to discharge when the motor vehicle is not being used for a moment.

The reason is that the electric power supplying these devices comes from the battery of the motor vehicle. Now, when the engine of the motor vehicle is stopped, the battery discharges without recharging.

It is therefore an aim of the present invention to provide a method for opening an opening panel of a motor vehicle without using the hands of an individual or user that authorizes effective and reliable opening of the opening panel for this authorized person while requiring low electric power consumption.

To this end, according to a first aspect, the invention relates to a method for opening an opening panel of a motor vehicle comprising the steps in which:

step A—the presence of at least one part of the body of an individual is detected by a capacitive or noncapacitive sensor;

step B—the individual is authenticated as being authorized to unlock the vehicle by an authentication means;

step C—a virtual switch is produced by projecting a light pattern onto the ground on which the motor vehicle is standing;

step D—the individual positions his foot so as to obscure the virtual switch in a predetermined manner;

step E—if the foot is not positioned in the predetermined manner, a signal is sent in order to restart step D; alternatively, step H—if the foot is positioned in the predetermined manner, a control means opens the opening panel.

The method of the invention allows the power consumption to be greatly limited, especially when the engine of the motor vehicle is stopped, and the battery cannot be recharged. At the same time, the method of the invention is very reliable, very effective and simple to use.

The reason is that the method of the invention advantageously allows the elements that allow the operation of the opening panel, of trunk or side-door type, to be active only when two conditions are combined: the detection of an individual and the authentication of said individual as being an authorized person.

This advantageously avoids permanent projection of the light pattern onto the ground, which would require the projection means to be permanently powered up.

Moreover, the opening of the opening panel is realized following a precise and predetermined movement of the foot of the user, which allows false detections brought about by objects or animals to be distinguished. The foot is set in motion within the context of the present invention only in order to obscure the light switch. Once said foot is positioned on the virtual switch and obscures said virtual switch, the control means for the opening panel opens the opening panel without the need for an additional movement by said foot. In other words, the opening of the opening panel is activated only if the positioning of the foot on the virtual switch complies with what is expected.

In the event of noncompliant execution, a signal is emitted to indicate that the movement has not been used correctly. It is thus possible to optimize the operating time for the whole operation of the opening of the opening panel and therefore to limit the power-up of the projection means to the minimum period of time for opening the trunk.

The method of the invention may moreover have one or more of the following features, taken separately or in combination:

the noncapacitive sensor is an optical sensor;

in step D, the predetermined manner includes a predetermined direction of movement, a set of dimensions and/or geometric shapes and the period of time during which the foot obscures the light pattern so that the control means opens the opening panel, which allows an impromptu object such as a tree branch to be prevented from operating the virtual switch;

a guide means for the predetermined direction of movement, such as an arc of a circle centered on the virtual switch, is associated with said virtual switch, which allows the user to be guided in a simple and effective manner;

the predetermined direction of movement 21 is substantially perpendicular to the plane formed by the opening panel of the motor vehicle, which allows the user to remain facing the opening panel;

step B is carried out permanently, which makes this step independent of the state of the motor vehicle;

in step E, the signal is flashing of the virtual switch, a change of color of the virtual switch, projection of a light pattern that is separate from that of the virtual switch and/or an audible signal, which allows any confusion for the user between the signal and the virtual switch to be avoided;

the method has an additional step F between steps B and C, in which an adaptation means for the detection zone allows the size of the detection zone to be adapted on the basis of a predetermined number of steps A and B in which, in the course of step B, the authentication of the user is not carried out, which allows the sensitivity of the capacitive or noncapacitive sensor to be adjusted or even reduced;

the method of the invention furthermore comprises a step G in which the detection zone resumes a size corresponding to the initial size after the authentication in the course of step B takes place or as soon as the motor vehicle is locked by any means, which allows a return to the initial sensitivity of the capacitive or noncapacitive sensor, the initial size corresponding to the size of the detection zone when step A is carried out for the first time.

Other features and advantages of the invention will emerge more clearly upon reading the description below, which is provided by way of illustrative and nonlimiting example, and the appended drawings, among which:

Figure 1:
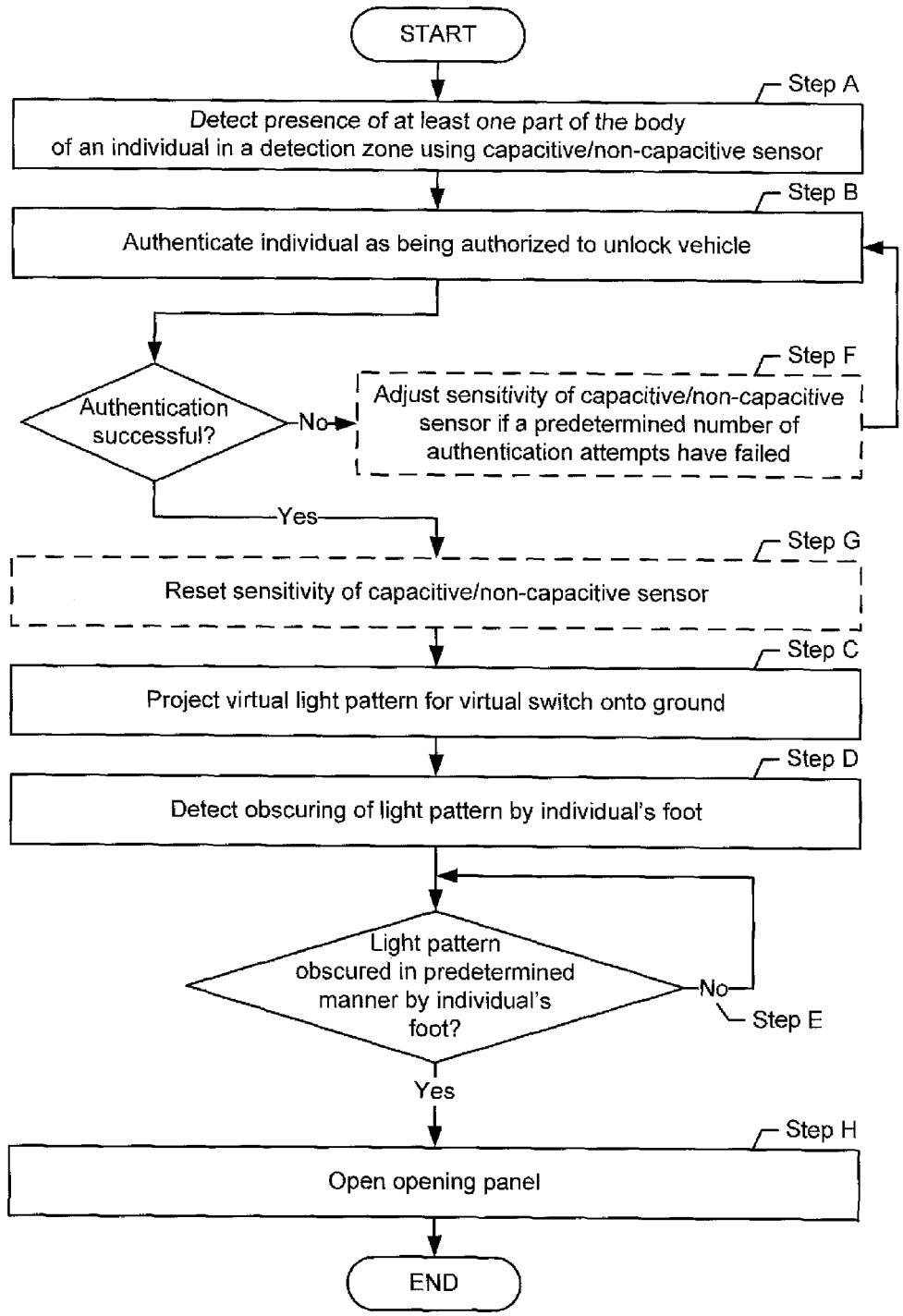
FIG. 1 is a diagram of an embodiment of the method of the invention.

As shown in FIG. 1, the method of the invention for opening an opening panel of a motor vehicle comprises the steps in which:

step A (reference 1)—the presence of at least one part of the body of an individual is detected by a capacitive or noncapacitive sensor;

step B (reference 2)—the individual is authenticated as being authorized to unlock the vehicle by an authentication means;

step C (reference 5)—a virtual switch is produced by projecting it onto the ground on which the motor vehicle is standing in the form of a light pattern;

step D (reference 6)—the individual positions his foot so as to obscure the virtual switch in a predetermined manner;

step E (reference 7)—if the movement of the foot is not effected in the predetermined manner, a signal is sent to indicate that the movement of the foot should be effected again; alternatively, if the movement is effected in the predetermined manner, a control means opens the opening panel.

Owing to the invention, the power consumption is limited on account of the fact that steps C, D and E take place only once steps A and B have been carried out.

The security against unwanted opening in the case of a malicious individual, an object or an impromptu animal is strengthened firstly by the succession of steps with the presence of step B and secondly by the fact that the opening panel is opened only if the movement of the foot is carried out in quite a precise manner.

Moreover, the period of time for projection of the light pattern onto the ground is optimized by the fact that, in the event of incorrect movement, a signal makes it possible in a simple, reliable and effective manner to indicate to the user that he can restart his movement immediately.

The opening panel of the motor vehicle may be the trunk, one of the side doors or else an externally accessible flap, such as the fuel or recharging flap.

The method of the invention can be carried out when the vehicle is locked or unlocked. The method of the invention can likewise be carried out when the engine of the motor vehicle is stopped or operating at a speed of movement that is substantially zero.

In step A of the method of the invention, the presence of at least one part of the body of an individual is detected by a capacitive or noncapacitive sensor.

The capacitive sensor may be an electrode or a set of electrodes that are arranged in a suitable manner on the bodywork of the motor vehicle so as to form an electromagnetic field forming a detection zone.

In particular, the electrode(s) may be mounted close to the opening panel to be opened so as to generate a detection zone having a wide angle. Thus, when the individual approaches the vehicle, the detection can be carried out over a wide approach angle. In other words, the individual does not have to present himself substantially facing the capacitive sensor(s) in order to be detected.

The detection takes place when a part of the body of the user, such as the hand, the head or else the foot, penetrates this detection zone by modifying the electromagnetic field.

To do this, the electrode(s) is/are connected to a central unit that interprets the variation in the electromagnetic field as a spotted detection.

The noncapacitive sensor may be an optical sensor such as a lamp associated with a phototransistor.

Once step A is carried out, namely a detection is spotted, step B can begin.

In step B of the method of the invention, the individual or the user is authenticated as being authorized to unlock the vehicle by an authentication means. "Authentication" is understood to mean a step allowing verification and validation of the identity of an individual as having the right to enter the motor vehicle.

The authentication means may be a transponder carried by the user or arranged next to the user, said transponder being capable of receiving the signal sent by an antenna. Said antenna is typically connected to a central unit so that said central unit implements step B after having validated step A.

Said central unit may be the same in step B and in step C.

Step B is carried out permanently. "Permanent" is understood here to mean that the authentication request is sent without a time interruption by a device of the authentication means or according to a predetermined period, for example approximately every 750 ms. Consequently, step B is carried out whatever the locking state of the motor vehicle. This advantageously avoids incorrect detections that result in the visual switch being lit when the vehicle is not locked.

Figure 2:
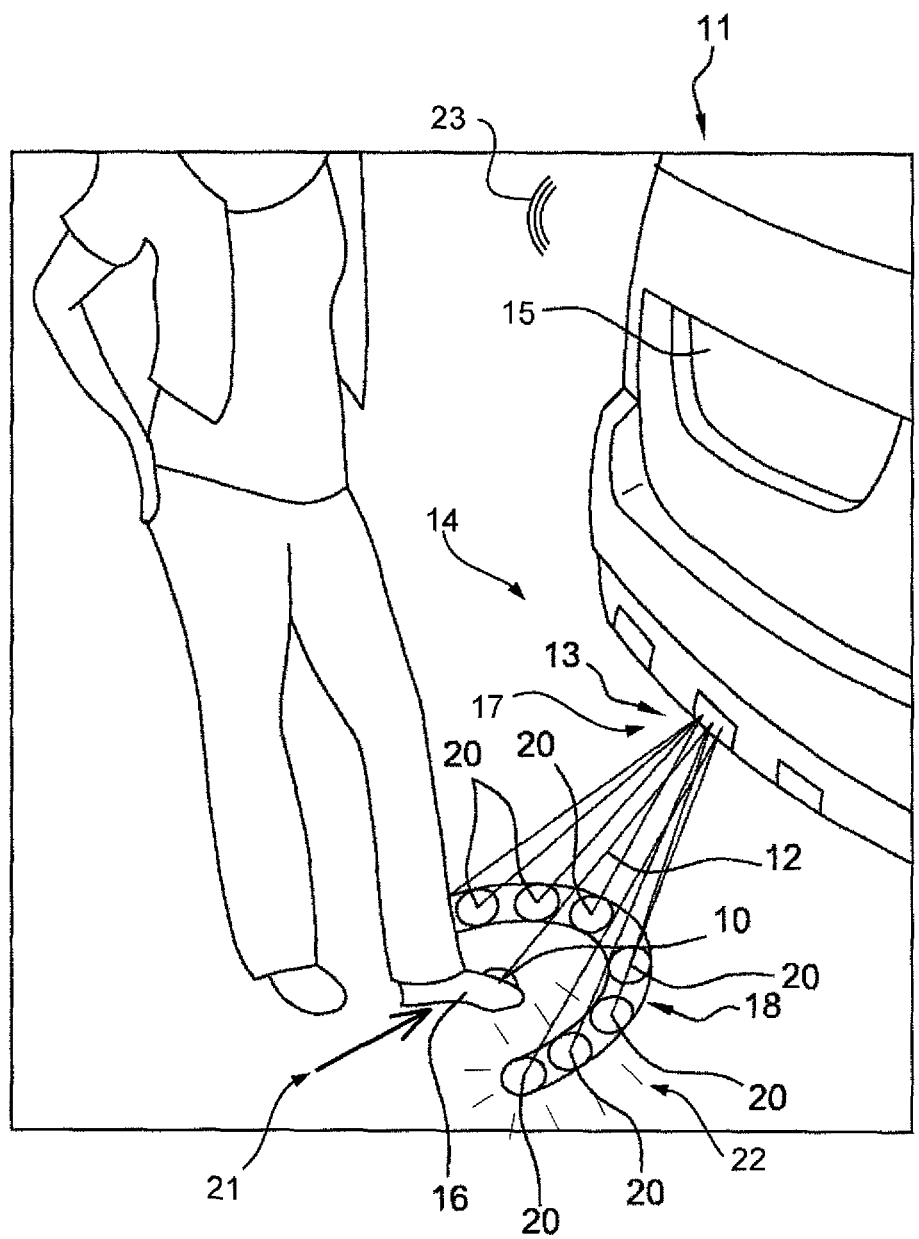
FIG. 2 is a perspective view of an embodiment of step C of the method of the invention.

Following step B, a light pattern 10 producing the virtual switch is projected in the course of step C onto the ground on which the motor vehicle 11 is standing (see FIG. 2).

The light pattern may be of any shape, notably a circle of light, an arrow indicating the direction of movement of the foot, or a cross.

The light pattern may have one shape or a multitude of shapes, for example a set of circles or arrows.

The light pattern may be of any color, notably green or red in order to be visible on the ground, notably on the surface of a street or a road.

To do this, projection means allow the light pattern to be projected. The projection means may have a laser and/or one or more diodes in order to produce the beam 12 forming the light pattern. Said projection set is connected to a central unit allowing it to be determined whether the foot movement has been made in compliance with the predetermined manner and whether the opening panel can be opened. Said central unit may be the same as that used for steps B and C.

The projection means may comprise one or more optical sensors configured to detect any light variation coming from the obscuration of the virtual switch.

Within the framework of the embodiment in FIG. 2, the projection means 13, notably the sensor, are arranged toward the rear of the vehicle so as to allow the trunk 15 to be opened.

Said optical sensor 17 makes it possible to determine whether the object obscuring the light pattern has the shape of a foot 16 on the basis of predetermined dimensions and a predetermined geometric shape.

Thus, the predetermined dimensions may be a width between 5 cm and 12 cm, a length between 25 cm and 35 cm and a height between 1 cm and 15 cm.

Thus, an object having a width, a height and a length in the above ranges and having a suitable shape is considered to be a foot.

Moreover, the obscuration must last for a predetermined period of time. By way of example, the period of time may be between 50 ms and 500 ms.

This advantageously prevents any interruption by an object or a small animal briefly appearing and obscuring the light pattern from being able to operate the control means before the authorized individual has been able to position his foot on the virtual switch.

Advantageously, the method of the invention may have an additional step F (reference 3) between steps B and C, in which an adaptation means for the detection zone allows the size of the detection zone to be adapted on the basis of a predetermined number of steps A and B, in which, in the course of step B, the authentication of the user is not carried out. This advantageously allows the sensitivity of the capacitive or noncapacitive sensor and of the detection to be adjusted.

It is thus possible to reduce the size of the detection zone. This allows the sensitivity of the detection to be reduced and the number of false detections to be limited. In this manner, the power consumption is reduced, since steps B to F are prevented from being implemented when the vehicle is parked in a place where people are constantly coming and going, in which there would be a lot of detection in step A.

Thus, the electric power consumption is once more advantageously limited to the quantity necessary for effective detection. In this case, the detection of persons passing without authorization is avoided.

To do this, it is possible, by way of example, to reduce by 25% the sensitivity at the end of 10 detections in step A without authentication in step B.

The method of the invention may furthermore have a step G (reference 4) in which the detection zone resumes a size corresponding to the initial size after the authentication in the course of step B takes place or as soon as the motor vehicle is locked by any means. Thus, after having adapted the sensitivity of detection to the environment of the motor vehicle, it is possible to return to the initial sensitivity of the capacitive or noncapacitive sensor, the initial size corresponding to the size of the detection zone when step A is carried out for the first time.

This may be advantageous when the motor vehicle is no longer parked in a zone with a lot of coming and going but rather is in an isolated parking place.

To do this, the sensitivity is redefined to its optimum level, possibly being the initial sensitivity level, when the authentication is carried out in step B or the vehicle changes locking state.

In step D of the method of the invention, the individual positions his foot so as to obscure the virtual switch in a predetermined manner.

The predetermined manner may include the direction of movement of the foot, a set of dimensions and/or geometric shapes and the period of time during which the foot obscures the light pattern. An impromptu object such as a tree branch is advantageously prevented from operating the virtual switch. The predetermined manner can be controlled notably owing to the projection means indicated above that are coupled to a central unit.

A guide means 18 for the direction of movement of the foot 16 may be associated with said virtual switch 10. Thus, the individual or the user is guided simply and effectively. The guide means may be of any shape centered on the virtual switch so as to clear a direction of movement for the foot. Thus, as shown in FIG. 2, said guide means is an arc of a circle centered on the virtual switch 14. To do this, it is possible to associate—as shown in FIG. 2—additional projection means for light patterns such as circles of light 20 around said switch.

Optical sensors allow the detection of any variation in luminosity owing to a beam that is intercepted by an object or by a foot. The optical sensors are typically connected to a central unit, which makes it possible to determine that the movement of the foot has not been performed correctly and not to trigger the opening of the opening panel.

The direction of movement may be substantially perpendicular to the plane formed by the opening panel of the motor vehicle. Thus, the user is able to remain facing the opening panel at a reasonable distance therefrom, which allows him not to be injured when the opening panel is opened or not to have to move in order to allow said opening.

Advantageously, the additional projection means 20 use a wavelength that is invisible to humans. This makes it possible for the beams used not to be visually displayed. Estheticism is therefore improved and confusion by the user during user can be limited.

In step E of the method of the invention, if the movement of the foot is not effected in the predetermined manner, a signal is sent to indicate that the movement of the foot should be effected again; alternatively, if the movement is effected in the predetermined manner, a control means opens the opening panel.

In other words, if the foot is not positioned in the predetermined manner, a signal is sent in order to restart step D; alternatively, if the foot is positioned in the predetermined manner, a control means opens the opening panel.

As indicated above, the activation of the opening of the opening panel, in the present example the trunk, is carried out after the light pattern has been obscured according to a period of time and a particular positioning of the foot. The movement serves to arrange the foot on the virtual switch in order to obscure the light pattern. If it proves necessary to restart step D, the individual must therefore move his foot in order to correctly reposition it according to the predetermined period of time. The individual knows that he needs to reposition his foot on account of the signal being sent.

The signal may be flashing 22 of the virtual switch, a change of color 22 of the virtual switch, projection of a light pattern 22 that is separate from the virtual switch and/or an audible signal 23, which allows any confusion for the user between the signal and the virtual switch to be avoided.

The invention claimed is:

1. A method for opening an opening panel of a motor vehicle comprising the steps in which:
   in step A the presence of at least one part of the body of an individual is detected by a capacitive or noncapacitive sensor;
   in step B the individual is authenticated as being authorized to unlock the vehicle by an authentication means;
   in step C a virtual switch is produced by projecting it onto the ground on which the motor vehicle is standing in the form of a light pattern;
   in step D the individual positions his foot so as to obscure the virtual switch in a predetermined manner, the predetermined manner including a predetermined direction of movement;

in step E if the foot is not positioned in the predetermined manner, a signal is sent in order to restart step D, or if the foot is positioned in the predetermined manner, a control means opens the opening panel, wherein a guide means for the predetermined direction of movement is associated with said virtual switch.

2. The method as claimed in claim 1, in which the noncapacitive sensor is an optical sensor.

3. The method as claimed in claim 1, wherein, in step D, the predetermined manner further includes a set of dimensions and/or geometric shapes and the period of time during which the foot obscures the light pattern must be obscured so that the control means opens the opening panel.

4. The method as claimed in claim 3, in which the guide means for the predetermined direction of movement is an arc of a circle centered on the virtual switch.

5. The method as claimed in claim 1, wherein the predetermined direction of movement is substantially perpendicular to the plane formed by the opening panel of the motor vehicle.

6. The method as claimed in claim 1, wherein step B is carried out permanently.

7. The method as claimed in claim 1, wherein in step E, the signal is flashing of the virtual switch, a change of color of the virtual switch, projection of a light pattern that is separate from that of the virtual switch and/or an audible signal.

8. The method as claimed in claim 1, further comprising a step F between steps B and C, in which an adaptation means for a detection zone of the capacitive or noncapacitive sensor allows the size of the detection zone to be adapted on the basis of a predetermined number of steps A and B in which, in the course of step B, the authentication of the user is not carried out.

9. The method as claimed in claim 8, further comprising a step G in which the detection zone resumes a size corresponding to the initial size after the authentication in the course of step B takes place or as soon as the motor vehicle is locked by any means.

10. The method according to claim 1, wherein the guide means is a projected shape around the light switch.

* * * * *